(12) United States Patent
Stata et al.

(10) Patent No.: US 10,182,025 B2
(45) Date of Patent: *Jan. 15, 2019

(54) SYSTEMS AND METHODS FOR A SEARCH-BASED EMAIL CLIENT

(71) Applicant: Excalibur IP, LLC, New York, NY (US)

(72) Inventors: Raymond P. Stata, Atherton, CA (US); Andrew W. Stack, Redwood City, CA (US); Tarak Goradia, Bangalore (IN); Patrick David Hunt, Palo Alto, CA (US); Thiruvalluvan Mg, Chennai (IN)

(73) Assignee: Excalibur IP, LLC, Sunnyvale, CA (US)

(*) Notice: Subject to any disclaimer, the term of this patent is extended or adjusted under 35 U.S.C. 154(b) by 39 days.

This patent is subject to a terminal disclaimer.

(21) Appl. No.: 15/188,679

(22) Filed: Jun. 21, 2016

(65) Prior Publication Data
US 2016/0301635 A1 Oct. 13, 2016

Related U.S. Application Data

(63) Continuation of application No. 13/854,904, filed on Apr. 1, 2013, now Pat. No. 9,438,540, which is a (Continued)

(51) Int. Cl.
G06F 17/30 (2006.01)
H04L 12/58 (2006.01)

(52) U.S. Cl.
CPC ........ *H04L 51/04* (2013.01); *G06F 17/30067* (2013.01); *H04L 51/00* (2013.01); *H04L 51/12* (2013.01); *H04L 51/22* (2013.01)

(58) Field of Classification Search
CPC ............ G06F 21/6227; G06F 21/6245; G06F 21/6272; G06F 21/629; G06F 2221/2119;
(Continued)

(56) References Cited

U.S. PATENT DOCUMENTS 5,701,469 A 12/1997 Brandli et al.
5,832,476 A 11/1998 Tada et al.
(Continued)

OTHER PUBLICATIONS

Microsoft Outlook, "Find related e-mail messages", Microsoft Office Online: Help and How-to, Microsoft Outlook screenshots, printed Feb. 13, 2008, 8 pages.

*Primary Examiner* — Angelica Ruiz
(74) *Attorney, Agent, or Firm* — Hickman Palermo Becker Bingham LLP (57) ABSTRACT

A search-based email client may incorporate a number of useful features. A search function can default to a search of all email contexts, thereby eliminating user cogitation over which context an email message may be stored in. Furthermore, the search function can automatically search for related personal content and/or related information on the internet or other computer network, and present this useful information to the user in addition to the returned emails. The search function can be integrated into a user interface to allow for one-click searches on any likely search field. The search function can search the body of email messages by default, thereby widening the scope of default searches and eliminating potentially missed information and user need to proactively widen their search. A search function can search attachments, which also provides a wider search scope.

20 Claims, 9 Drawing Sheets

Related U.S. Application Data continuation of application No. 10/966,259, filed on Oct. 15, 2004, now abandoned.

(60) Provisional application No. 60/512,066, filed on Oct. 17, 2003.

(58) Field of Classification Search
CPC ........... G06F 2221/2141; G06F 17/243; G06F 17/2725
See application file for complete search history.

(56) References Cited

U.S. PATENT DOCUMENTS

| | | | |
|---|---|---|---|
| 5,878,410 A | 3/1999 | Zbikowski et al. | |
| 6,061,678 A | 5/2000 | Klein et al. | |
| 6,061,692 A | 5/2000 | Thomas et al. | |
| 6,078,924 A | 6/2000 | Ainsbury et al. | |
| 6,327,574 B1 | 12/2001 | Kramer et al. | |
| 6,353,925 B1 | 3/2002 | Stata et al. | |
| 6,502,095 B2 | 12/2002 | Breitbart et al. | |
| 6,598,051 B1 | 7/2003 | Wiener et al. | |
| 6,654,734 B1 | 11/2003 | Mani et al. | |
| 6,701,359 B1 | 3/2004 | Calabrez et al. | |
| 6,725,227 B1 | 4/2004 | Li | |
| 6,826,566 B2 | 11/2004 | Lewak et al. | |
| 7,064,688 B2 | 6/2006 | Collins et al. | |
| 7,149,748 B1 | 12/2006 | Stephan | |
| 7,305,381 B1 | 12/2007 | Poppink et al. | |
| 2001/0054073 A1 | 12/2001 | Ruppert et al. | |
| 2002/0143755 A1 | 10/2002 | Wynblatt et al. | |
| 2002/0184380 A1 | 12/2002 | Weider et al. | |
| 2003/0009694 A1* | 1/2003 | Wenocur | G06Q 10/107 726/4 |
| 2003/0069880 A1* | 4/2003 | Harrison | G06F 17/30663 |
| 2003/0120647 A1 | 6/2003 | Aiken et al. | |
| 2003/0126136 A1* | 7/2003 | Omoigui | G06F 17/3089 |
| 2003/0191737 A1 | 10/2003 | Steele et al. | |
| 2003/0229299 A1 | 12/2003 | Shimura et al. | |
| 2003/0233224 A1 | 12/2003 | Marchisio et al. | |
| 2004/0006456 A1 | 1/2004 | Loofbourrow et al. | |
| 2004/0006555 A1 | 1/2004 | Yamamoto et al. | |
| 2004/0015478 A1 | 1/2004 | Pauly | |
| 2004/0034688 A1 | 2/2004 | Dunn | |
| 2004/0051812 A1 | 3/2004 | Hayward | |
| 2004/0064442 A1 | 4/2004 | Popovitch | |
| 2004/0073536 A1 | 4/2004 | Smith-Semedo et al. | |
| 2004/0093328 A1 | 5/2004 | Damle | |
| 2004/0143569 A1 | 7/2004 | Gross et al. | |
| 2004/0153436 A1 | 8/2004 | Pope et al. | |
| 2004/0176940 A1 | 9/2004 | Bosshart et al. | |
| 2004/0177061 A1 | 9/2004 | Xu et al. | |
| 2004/0181511 A1 | 9/2004 | Xu et al. | |
| 2004/0181607 A1 | 9/2004 | Xu et al. | |
| 2004/0199530 A1 | 10/2004 | Avadhanam et al. | |
| 2004/0202214 A1 | 10/2004 | Aronson et al. | |
| 2004/0205357 A1 | 10/2004 | Kuo et al. | |
| 2004/0205473 A1 | 10/2004 | Fisher et al. | |
| 2004/0205514 A1 | 10/2004 | Sommerer et al. | |
| 2007/0038449 A1 | 2/2007 | Coifman | |

* cited by examiner

SYSTEMS AND METHODS FOR A SEARCH-BASED EMAIL CLIENT

BENEFIT CLAIM

This application claims the benefit under 35 U.S.C. § 120 as a Continuation of U.S. patent application Ser. No. 13/854,904, filed Apr. 1, 2013, which is a continuation of application Ser. No. 10/966,259, filed Oct. 15, 2004, which in turn claims priority to U.S. Provisional Application Ser. No. 60/512,066, filed on Oct. 17, 2003, titled "SEARCHED-BASED EMAIL CLIENT," all of which are hereby incorporated by reference in their entirety. The applicants hereby rescind any disclaimer of claim scope in the parent applications or the prosecution history thereof, and advise the USPTO that the claims in this application may be broader than any claim in the parent applications.

COPYRIGHT NOTICE AND PERMISSION

A portion of the disclosure of this patent document may contain material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice shall apply to this document: Copyright© 2003-2004, Stata Laboratories, Inc.

FIELD OF THE INVENTION

The present invention is directed to systems and methods for integrating search functions into an email client user interface (UI). More particularly, it is directed to providing easily accessible search functions that trigger searches of sufficient scope, thereby reducing user confusion over the possible locations of desired information and reducing the time loss and physical burden of repetitive actions in conducting searches.

BACKGROUND OF THE INVENTION

Personal computer users are currently subject to a growing volume of personal digital content that they must process and manage. Email, electronic documents, digital photos, digital music and video are all forms of content that are seeing increasing use and require attention to process or store on a user device. The volume of emails specifically that a user will receive has increased dramatically in recent years. Currently the average user receives 35 email a day, and over 40 Million people in the U.S. spend more than 2 hours a day working with email. Email clients allow users to access their email collections, as well as a variety of other personal data and data generally on a wide-variety of devices, e.g., computers, kiosks, PDAs, and mobile phones.

A growing number of people who typically manage large volumes of email are either beginning to outgrow or are becoming increasingly frustrated with the burden of mailbox overload, as well as the limitations and inefficiencies of traditional folder-based email clients. While search functions are available in present folder-based email clients, these features generally require a user to define a scope for the search, and may not search all of the information needed to locate a desired item. Moreover, the search features in present email clients can be cumbersome to access, and often require excessive user action to operate. In today's world, a user savings of a single click, thereby enabling the user perform an action in two clicks instead of three, is a significant savings resulting in increased efficiency, less frustration, and less repetitive motion.

With the growing volume of personal digital content, especially within email but applicable to other personal digital content, it is increasingly difficult for the user to find what he is looking for in a timely manner. Current email content is typically widely distributed in various folders which may reside across a network on a server. It costs the user time and effort to correctly search over the proper domain of content. A user may have multiple folders in complex hierarchies which are designed to help locate content at a future time. However, these folder structures over time become exceedingly difficult and time-consuming to maintain as content grows.

For an email user, a growing amount of text-based content is contained within email attachments. These attachments are usually binary files in popular formats such as the Microsoft Word, Excel, or PowerPoint document format. When the user is looking for text-based content in an attachment, he is forced to also recall the title of the document, since search capabilities on the text content of the attachments are not readily available.

The mechanisms for searching for content and related information are time-consuming and frustrating. Users must typically navigate within their messaging client to a separate search window that requires multiple parameters to be entered in order to complete a search. The state of the art treats the concept of searching as a separate feature. This "search" or "find" functionality is not prominently displayed in the user interface. For some messaging clients, advanced search capabilities are offered, but are located deep in the user interface navigation hierarchy and require up to seven separate mouse clicks to enable a full-text, full-repository search. A search that requires a user to enter information, then select a search scope, then select a button to execute a search requires at least three user actions. Users today desire access to information with fewer steps, preferably just one action. Considering the large number of times a user may have to conduct a search for information in today's workplace, and the rise of repetitive motion ailments such as carpal tunnel syndrome, it is understandable that users want a more streamlined UI.

The execution of a search with existing messaging clients is inefficient and slow. When a search is performed over a full-body text, full-repository domain, the execution of the search can take minutes to complete. This is in part due to text content that is not indexed in advance of a search, and in part due to cumbersome UI mechanisms for carrying out searches.

The default behavior of the current messaging clients is to search only within a current message context, meaning a current result list or folder. Additional user steps must be taken to increase the domain over which a search is executed; however, this typically comes at the cost of dramatically increasing the time to complete the search.

Moreover, for a given message, the default behavior of present email clients is to search only the message header information, which usually contains only subject and sender data. Additional steps must be taken to enable a search over the body text of email messages, if the messaging client supports such searches at all.

In view of the explosion of personal content and the difficulties in accessing personal content and other desirable information from an email client, and in view of the need to reduce the number of user actions required in searching for needed information, there is a need in the industry to provide an email client that integrates search functions in a more accessible manner, and that conducts more effective searches of a wider scope to facilitate user location of desired information without needless cogitation over where the data may be located or repetitive physical motion.

SUMMARY OF THE INVENTION

In view of the foregoing, the present invention is directed to systems and methods for a search-based email client. There are a number of features that may be incorporated in such an email client. A search function default to a search of all email contexts, thereby eliminating user cogitation over which context an email message may be stored in. Furthermore, the search function can automatically search for related personal content and/or related information on the internet or other computer network, and present this useful information to the user in addition to the returned emails. The search function can also be integrated into a user interface (UI) so as to allow for one-click searches on a sender, a recipient, a subject line, or other likely search field. The search function can search the body of email messages by default, thereby widening the scope of default searches and eliminating potentially missed information and user need to proactively widen their search. A search function can search attachments, which also provides a wider search scope. Other features and embodiments of the present invention are described below.

BRIEF DESCRIPTION OF THE DRAWINGS

The systems and methods for a search based email client in accordance with the present invention are further described with reference to the accompanying drawings in which.

DETAILED DESCRIPTION OF ILLUSTRATIVE EMBODIMENTS

Certain specific details are set forth in the following description and figures to provide a thorough understanding of various embodiments of the invention. Certain well-known details often associated with computing and software technology are not set forth in the following disclosure, however, to avoid unnecessarily obscuring the various embodiments of the invention. Further, those of ordinary skill in the relevant art will understand that they can practice other embodiments of the invention without one or more of the details described below. Finally, while various methods are described with reference to steps and sequences in the following disclosure, the description as such is for providing a clear implementation of embodiments of the invention, and the steps and sequences of steps should not be taken as required to practice this invention.

The following detailed description is generally divided into five sections. First, exemplary networked and distributed environments are briefly discussed. Networks are a defining element of modern computing, and the invention is particularly suited to enhancing electronic communications across computer networks. Second, an exemplary computing device is described. Third, exemplary distributed computing frameworks are briefly discussed. Fourth, a discussion of improved querying and indexing is briefly discussed. Because various embodiments of the invention rely more heavily on search as a means for location of desired information, and perform searches of wider scope both in terms of the number and variety of fields that may be searched, the use of indexing conjunction with many of the embodiments to speed the searches in is preferred. Finally, various aspects of an exemplary search-based email client are set forth.

Exemplary Networked and Distributed Environments

One of ordinary skill in the art can appreciate that a computer or other client or server device can be deployed as part of a computer network, or in a distributed computing environment. In this regard, the present invention pertains to any computer system having any number of memory or storage units, and any number of applications and processes occurring across any number of storage units or volumes, which may be used in connection with querying according to the invention. The present invention may apply to an environment with server computers and client computers deployed in a network environment or distributed computing environment, having remote or local storage. The present invention may also be applied to standalone computing devices, having programming language functionality, interpretation and execution capabilities for generating, receiving and transmitting information in connection with remote or local services.

Distributed computing facilitates sharing of computer resources and services by direct exchange between computing devices and systems. These resources and services include the exchange of information, cache storage, and disk storage for files. Distributed computing takes advantage of network connectivity, allowing clients to leverage their collective power to benefit the entire enterprise. In this regard, a variety of devices may have applications, objects or resources that may implicate the querying mechanism(s) of the invention.

Figure 1A:
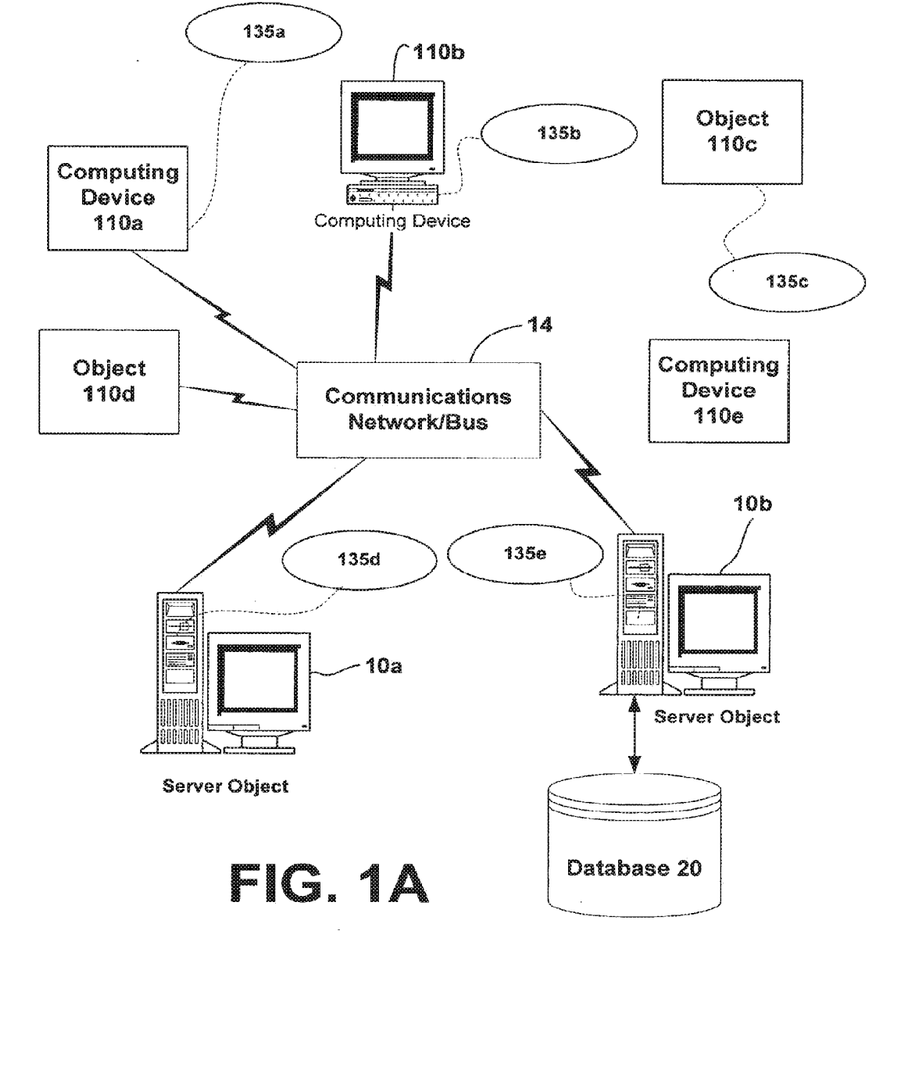
FIG. 1A is a block diagram representing an exemplary network environment having a variety of computing devices in which the invention may be implemented.

FIG. 1A provides a schematic diagram of an e exemplary networked or distributed computing environment. The distributed computing environment comprises computing objects 10a, 10b, etc. and computing objects or devices 110a, 110b, 110c, etc. These objects may comprise programs, methods, data stores, programmable logic, etc. The objects may comprise portions of the same or different devices such as PDAs, televisions, MP3 players, televisions, personal computers, etc. Each object can communicate with another object by way of the communications network 14. This network may itself comprise other computing objects and computing devices that provide services to the system of FIG. 1A. In accordance with an aspect of the invention, each object 10a, 10b, etc. or 110a, 110b, 110c, etc. may contain an application that might make use of an API, or other object, software or hardware, to request use of the querying mechanism(s) of the invention.

In a distributed computing architecture, computers, which may have traditionally been used solely as clients, communicate directly among themselves and can act as both clients and servers, assuming whatever role is most efficient for the network. This reduces the load on servers and allows all of the clients to access resources available on other clients, thereby increasing the capability and efficiency of the entire network. Services that use the querying mechanism(s) in accordance with the present invention may thus be distributed among clients and servers, acting in a way that is efficient for the entire network.

Distributed computing can help businesses deliver services and capabilities more efficiently across diverse geographic boundaries. Moreover, distributed computing can move data closer to the point where data is consumed acting as a network caching mechanism. Distributed computing also allows computing networks to dynamically work together using intelligent agents. Agents reside on peer computers and communicate various kinds of information back and forth. Agents may also initiate tasks on behalf of other peer systems. For instance, intelligent agents can be used to prioritize tasks on a network, change traffic flow, search for files locally or determine anomalous behavior such as a virus and stop it before it affects the network. All sorts of other services may be contemplated as well. Since data may in practice be physically located in one or more locations, the ability to distribute services that make use of the querying mechanism(s) described herein is of great utility in such a system.

It can also be appreciated that an object, such as 110c, may be hosted on another computing device 10a, 10b, etc. or 110a, 110b, etc. Thus, although the physical environment depicted may show the connected devices as computers, such illustration is merely exemplary and the physical environment may alternatively be depicted or described comprising various digital devices such as PDAs, televisions, MP3 players, etc., software objects such as interfaces, COM objects and the like.

There are a variety of systems, components, and network configurations that support distributed computing environments. For example, computing systems may be connected together by wire line or wireless systems, by local networks or widely distributed networks. Currently, many of the networks are coupled to the Internet, which provides the infrastructure for widely distributed computing and encompasses many different networks.

In home networking environments, there are at least four disparate network transport media that may each support a unique protocol, such as Power line, data (both wireless and wired), voice (e.g., telephone) and entertainment media. Most home control devices such as light switches and appliances may use power line for connectivity. Data Services may enter the home as broadband (e.g., either DSL or Cable modem) and are accessible within the home using either wireless (e.g., HomeRF or 802.11b) or wired (e.g., Home PNA, Cat 5, even a power line) connectivity. Voice traffic may enter the home either as wired (e.g., Cat 3) or wireless (e.g., cell phones) and may be distributed within the home using Cat 3 wiring. Entertainment media, or other graphical data, may enter the home either through satellite or cable and is typically distributed in the home using coaxial cable. IEEE 1394 and DVI, for instance, are also digital interconnects for clusters of media devices. All of these network environments and others that may emerge as protocol standards may be interconnected to form an intranet that may be connected to the outside world by way of the Internet. In short, a variety of disparate sources exist for the storage and transmission of data, and consequently, moving forward, computing devices will require ways of sharing data, such as data accessed or utilized incident to program objects, which make use of the querying mechanism(s) in accordance with the present invention.

Thus, FIG. 1A illustrates an exemplary networked or distributed environment, with a server in communication with client computers via a network/bus, in which the present invention may be employed. In more detail, a number of servers 10a, 10b, etc., are interconnected via a communications network/bus 14, which may be a LAN, WAN, intranet, the Internet, etc., with a number of client or remote computing devices 110a, 110b, 110c, 110d, 110e, etc., such as a portable computer, handheld computer, thin client, networked appliance, or other device, such as a VCR, TV, oven, light, heater and the like in accordance with the present invention. It is thus contemplated that the present invention may apply to any computing device in connection with which it is desirable to query a data store to retrieve information.

In a network environment in which the communications network/bus 14 is the Internet, for example, the servers 10a, 10b, etc. can be Web servers with which clients 110a, 110b, 110c, 110d, 110e, etc. communicate via any of a number of known protocols such as HTTP. Servers 10a, 10b, etc. may also serve as clients 110a, 110b, 110c, 110d, 110e, etc., as may be characteristic of a distributed computing environment. Communications may be wired or wireless, where appropriate. Client devices 110a, 110b, 110c, 110d, 110e, etc. may or may not communicate via communications network/bus 14, and may have independent communications associated therewith. For example, in the case of a TV or VCR, there may or may not be a networked aspect to the control thereof, and a user might wish to select a date with a remote control device interoperating with an on screen UI. Each client computer 110a, 110b, 110c, 110d, 110e, etc. and server computer 10a, 10b, etc. may be equipped with various application program modules or objects 135 and with connections or access to various types of storage elements or objects, across which files may be stored or to which portion(s) of files may be downloaded or migrated. Any computer 10a, 10b, 110a, 110b, etc. may be responsible for the maintenance and updating of a database 20 or other storage element in accordance with the present invention, such as a database or memory 20 for storing data queried according to the invention. Thus, the present invention can be utilized in a computer network environment having client computers 110a, 110b, etc. that can access and interact with a computer network/bus 14 and server computers 10a, 10b, etc. that may interact with client computers 110a, 110b, etc. and other like devices, and databases 20.

Exemplary Computing Device

Figure 1B:
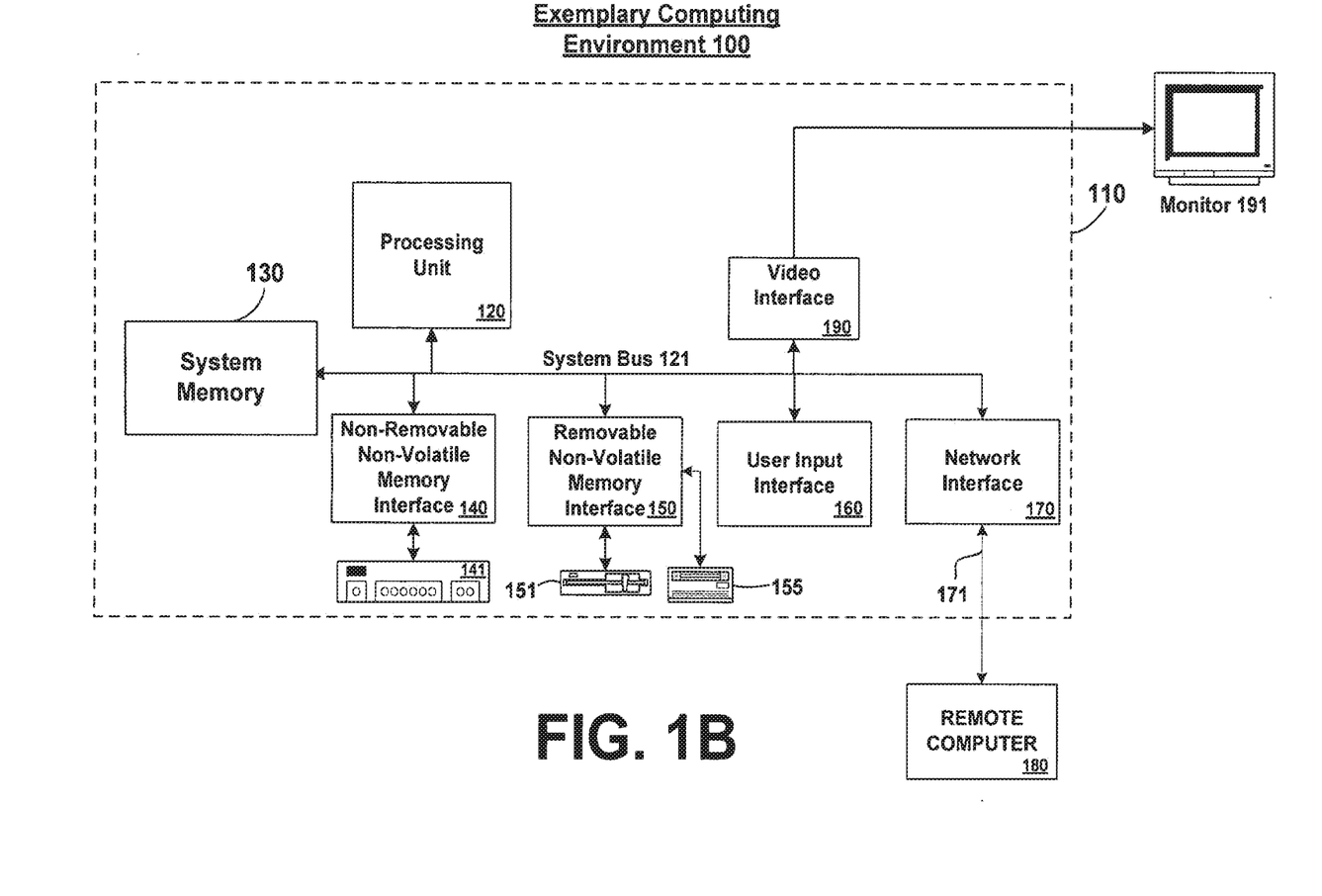
FIG. 1B is a block diagram representing an exemplary non-limiting computing device in which the present invention may be implemented.

FIG. 1B and the following discussion are intended to provide a brief general description of a suitable computing environment in which the invention may be implemented. It should be understood, however, that handheld, portable and other computing devices and computing objects of all kinds are contemplated for use in connection with the present invention. While a general purpose computer is described below, this is but one example, and the present invention may be implemented with a thin client, or stripped down client such as a smart phone, having network/bus interoperability and interaction. Thus, the present invention may be implemented in an environment of networked hosted services in which very little or minimal client resources are implicated, e.g., a networked environment in which the client device serves merely as an interface to the network/bus, such as an object placed in an appliance. In essence, anywhere that event data may be stored or from which event data may be retrieved, or where it is desirable to search and retrieve information, is a desirable, or suitable, environment for operation of the search-based email client of the invention.

Although not required, the invention can be implemented via an operating system, for use by a developer of services for a device or object, and/or included within application software that operates in connection with querying in accordance with the invention. Software may be described in the general context of computer-executable instructions, such as program modules, being executed by one or more computers, such as client workstations, servers or other devices. Generally, program modules include routines, programs, objects, components, data structures and the like that perform particular tasks or implement particular abstract data types. Typically, the functionality of the program modules may be combined or distributed as desired in various embodiments. Moreover, those skilled in the art will appreciate that the invention may be practiced with other computer system configurations and protocols. Other well known computing systems, environments, and/or configurations that may be suitable for use with the invention include, but are not limited to, personal computers (PCs), automated teller machines, server computers, hand-held or laptop devices, multi-processor systems, microprocessor-based systems, programmable consumer electronics, network PCs, appliances, lights, environmental control elements, minicomputers, mainframe computers and the like. The invention may also be practiced in distributed computing environments where tasks are performed by remote processing devices that are linked through a communications network/bus or other data transmission medium. In a distributed computing environment, described in more detail above, program modules may be located in both local and remote computer storage media including memory storage devices, and client nodes may in turn behave as server nodes.

FIG. 1B thus illustrates an example of a suitable computing system environment 100 in which the invention may be implemented, although as made clear above, the computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

With reference to FIG. 1B, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

A user may enter commands and information into the computer 110 through input devices such as a keyboard or pointing device, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A monitor 191 or other type of display device is also connected to the system bus 121 via an interface, such as a video interface 190, which may in turn communicate with video memory. In addition to monitor 191, computers may also include other peripheral output devices such as speakers and a printer, which may be connected through an output peripheral interface.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The computer 110 may also include other removable/non-removable, volatile/nonvolatile computer storage media. By way of example only, FIG. 1B illustrates a hard disk drive 141 that reads from or writes to non-removable, nonvolatile magnetic media, a magnetic disk drive 151 that reads from or writes to a removable, nonvolatile magnetic disk, and an optical disk drive 155 that reads from or writes to a removable, nonvolatile optical disk, such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1B provide storage of computer readable instructions, data structures, program modules and other data for the computer 110.

The computer 110 may operate in a networked or distributed environment using logical connections to one or more remote computers, such as a remote computer 180. The remote computer 180 may be a personal computer, a server, a router, a network PC, a peer device or other common network node, and typically includes many or all of the elements described above relative to the computer 110. The logical connections depicted in FIG. 1B include a local area network (LAN) 171 via network interface 170, or alternatively a wide area network (WAN), but may also include other networks/buses. Such networking environments are commonplace in homes, offices, enterprise-wide computer networks, intranets and the Internet.

Exemplary Distributed Computing Frameworks or Architectures

Various distributed computing frameworks have been and are being developed in light of the convergence of personal computing and the Internet. Individuals and business users alike are provided with a seamlessly interoperable and Web-enabled interface for applications and computing devices, making computing activities increasingly Web browser or network-oriented.

For example, an exemplary distributed computing framework or platform includes servers, building-block services, such as Web-based data storage and downloadable device software. Generally speaking, a distributed computing framework provides (1) the ability to make an entire range of computing devices work together and to have user information automatically updated and synchronized in all of them, (2) increased interactive capability for Web sites, enabled by greater use of XML rather than HTML, (3) online services that feature customized access and delivery of products and services to the user from a central starting point for the management of various applications, such as e-mail, for example, or other software, (4) centralized data storage, which increases efficiency and ease of access to information, as well as synchronization of information among users and devices, (5) the ability to integrate various communications media, such as e-mail, faxes, and telephones, (6) for developers, the ability to create reusable modules, thereby increasing productivity and reducing the number of programming errors and (7) many other cross-platform integration features as well. In this regard, the querying mechanism(s) of the invention may be provided as an integral part of such an application development framework, such that developers can easily include the mechanism(s) in new applications, and easily deliver the querying and associated UI mechanism(s) to end users as part of various services and applications, for instance, that may search through a variety of data wherever located.

Querying and Indexing

Various embodiments of a search-based email client in accordance with the systems and methods provided herein may operate in conjunction with a PCDB. Information in a PCDB can be indexed in a number of clever ways, and the present invention is not limited to the manner of executing a search across stored data. However, because of the large volumes of data that may be searched in connection with the operation of the invention, it is preferable to store that data in manner that supports streamlined high-speed searching. The following brief description generally addresses systems and methods for querying and indexing data in a manner that is suitable for use in various embodiments of the invention.

Fast processing of full-text queries may involve the use of a full-text index of the documents being searched. A full-text index for a document collection U has an entry called a posting list for each term appearing in U. A posting list is a sequence of entries called postings which describe an occurrence of a term in a document. To find the documents satisfying a query, the query component, or query engine, looks up the posting list of each of the terms in the query and combines those lists according to the operators in the query.

For example, imagine the user enters the simple query "zoology." In this case, the query engine would look up this term in the index and return each document found in the resulting posting list. If the user enters "zoology AND textbooks," the query engine looks up both posting lists and returns their intersection. If the user enters "zoology OR husbandry," the query engine looks up both posting lists and returns their union.

Figure 2A:
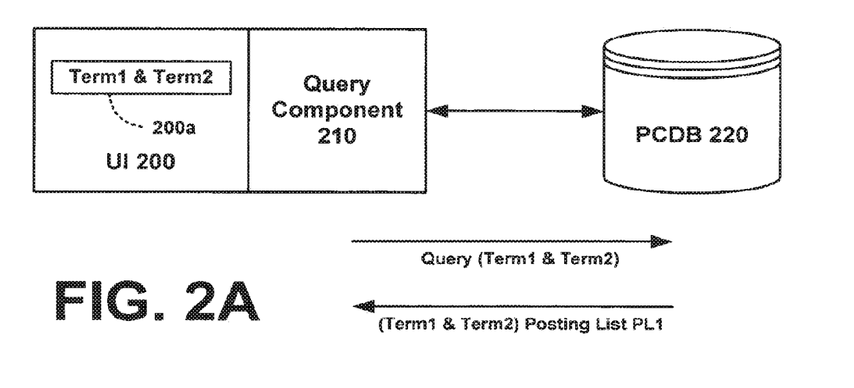
FIGS. 2A to 2C illustrate some exemplary non-limiting underlying techniques for querying a database in accordance with the invention.
Figure 2B:
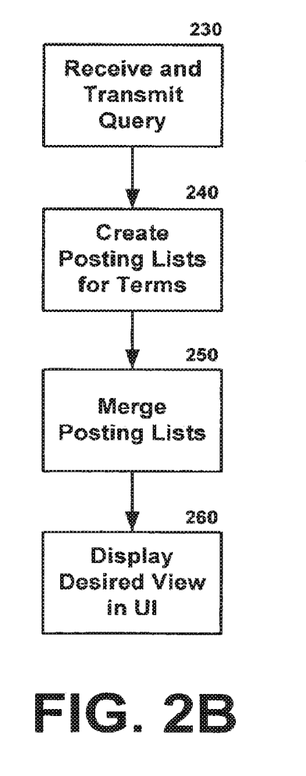
Figure 2C:
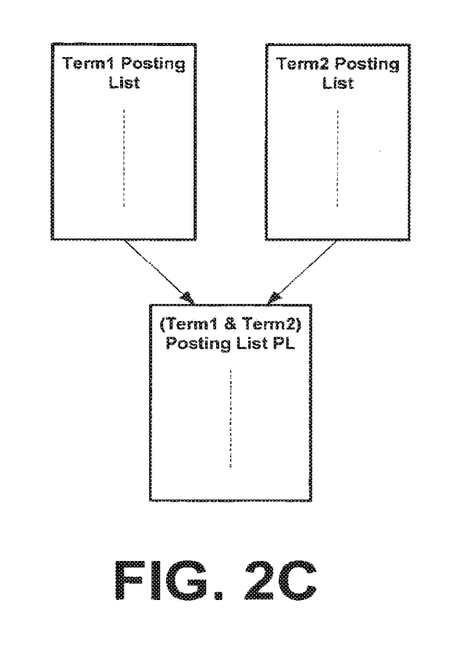

The execution of a simple query is illustrated in FIGS. 2A to 2C. As shown in FIG. 2A, an application or service may include a UI component 200 that includes a UI text box control 200a for receiving terms for a query against a PCDB 220, such as an email store. A query component 210 that handles the packaging, transmission, reception and processing of results (illustrated as a single integrated component although each function may be provided as separate objects, which need not be co-located) receives a query "Term1 & Term2" and performs the query against the content in data store 220. It can be appreciated that a query can operate to examine document metadata as well as document content. For instance, a query may be associated with documents with a particular title, size, date, folder, etc.

Typically, then, as shown in FIG. 2B, after the query is received at 230, two posting lists are created at 240, i.e., one for Term1 and one for Term2 of the query. At 250, the posting lists are merge compared to reflect only documents that contain both Term1 and Term2, as shown in FIG. 2C. With a list of documents, or document IDs, that satisfy the query as represented by posting list PL, and depending upon the view desired in connection with the application including UI 200, information about the documents is displayed to the user. This might include the number of documents that satisfy the query and/or include the presentation of summary information, such as property information or other metadata, relating to the documents, or any other desirable view tailored to the posting list returned by the query engine. Thus, with a list of references to documents that satisfy the query, any view of those documents may thus be presented to the user at 260.

In some systems, a posting simply includes the identification of or reference to a document ("Doc ID") containing the term. In others, a posting may include a Doc ID plus the count in that document to aid in certain forms of rankings. In others, a posting may include the Doc ID plus a list of locations within that document where the term occurs to aid in highlighting the search terms in the result set.

Posting lists are typically stored on and accessed from disks, which are sequential-access devices. Thus, an issue with the design of full-text indexes is the order in which postings are kept. Two different factors influence the ordering of these lists. One factor is support for combining posting lists. For example, if posting lists are sorted by Doc ID, then one can take the intersection of two posting lists by reading them sequentially, in parallel, and performing efficient merge operations on the lists. If they are not sorted, then taking an intersection involves reading the smaller one into RAM, which can be expensive.

The other factor influencing the order of posting lists is ranking: if it is possible to rank documents heavily, or if it is possible to rank postings in a fashion that is highly correlated with the anticipated rank of documents, then ordering posting lists according to these ranking factors can aid in a so-called "top-N" queries in which the goal is to return only the top-Nth highest-rank documents.

Thus, the particular form of a posting in a posting list may thus take a variety of forms depending upon the application, and the invention is not limited to operation in tandem with any particular form. It can be appreciated that the techniques of the invention may be applied to any implementation of a posting list, or, for that matter, with any mechanism for storing and retrieving personal data.

Aspects of an Exemplary Search-Based Email Client

Figure 3:
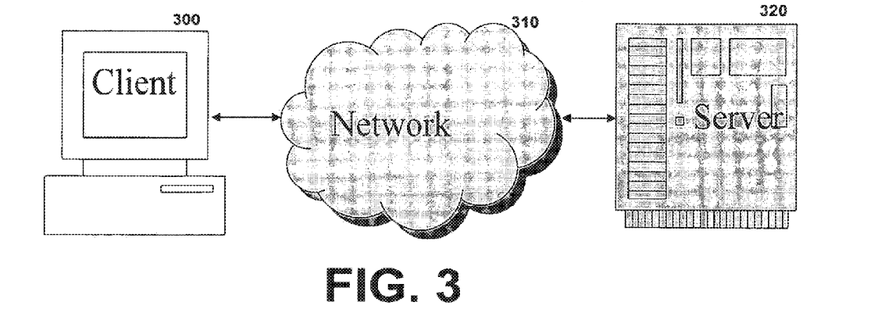
FIG. 3 illustrates the components of a message system with an email client 300, a network 310, and a server 320.

FIG. 3 depicts the components of a message system with an email client 300. Such a system may comprise "client side" equipment 300—for example, a desktop computer, laptop computer, or PDA—and "server side" equipment 320 separated by a network 310. In general, the email client 300 accesses data from a variety of sources that may reside locally on the client 300, or on the server 320, or elsewhere on the network 310.

Figure 4:
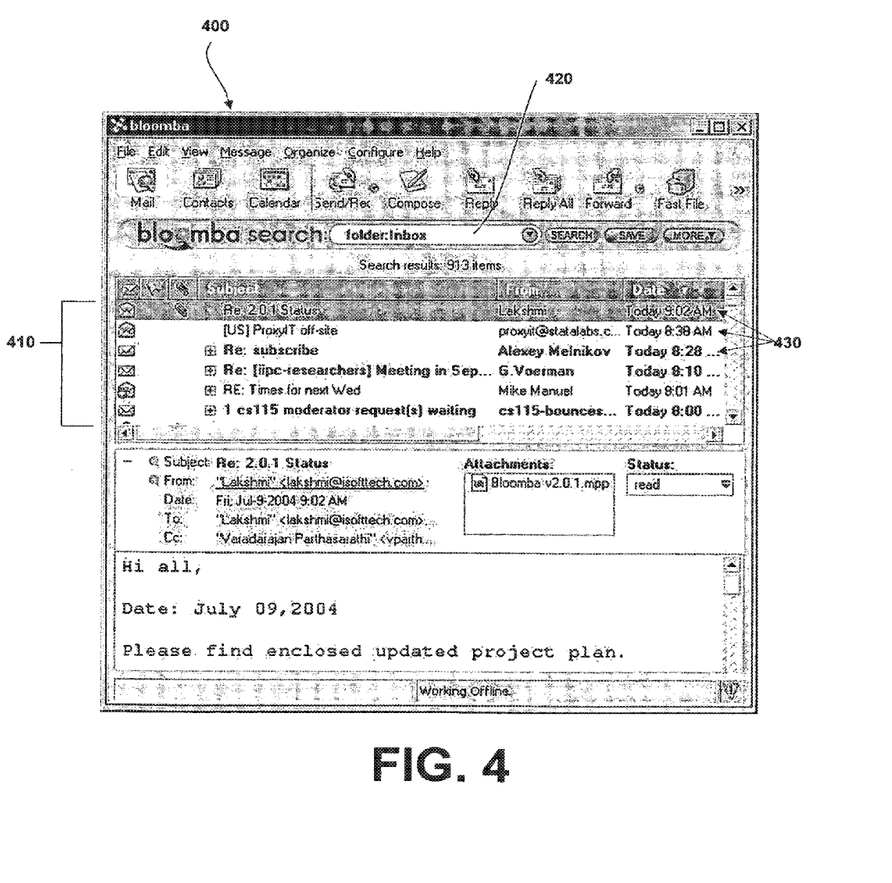
FIG. 4 illustrates an email client UI 400 that displays a message list 410 which comprises message summaries 430 for the messages contained in a message context 420.

Referring to FIG. 4, all messaging client UIs 400 have what is referred to herein as a message list 410. A message list 410 may reside in a portion of a UI window 400, or in its own UI window (not shown). The message list 410 typically comprises message summaries 430 for the messages contained in a message context 420. A message context 420 is a meaningful collection of messages, such as the messages in the user's Inbox, the messages contained in some other folder, or the messages returned by running a search. A message summary 430 contains information meant to help the user predict the content and/or purpose of a message and thus determine whether he should retrieve the entire message. This information typically includes the sender, date, and subject-line of the message, and might include other information such as the size, a list of other recipients, a list of attachments, auxiliary information such as whether or not the message has an attachment or has been read, and/or the first few lines of the message itself. A message repository (not illustrated) is a stored collection of all messages. A message repository may be stored locally or on a server that is accessible to an email client.

Figure 5A:
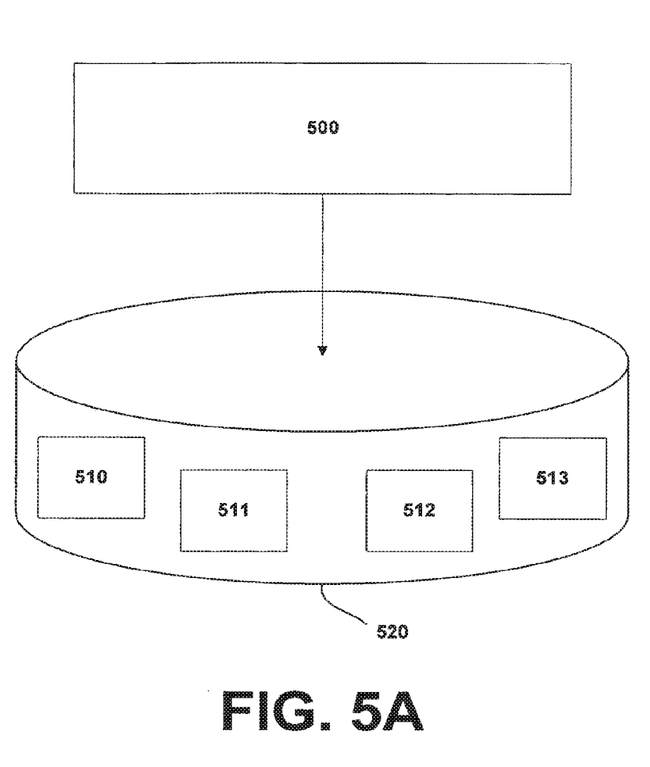
FIG. 5A illustrates a search process 500 that can search through the emails in a plurality of groups 510-513, or contexts, within a repository 520.

FIG. 5A illustrates a search process 500 that can search through the emails in a plurality of groups 510-513, or contexts, within a repository 520. The search of all groups 510-513 can be conducted by default when a user orders a search. When a search is performed in the exemplary system of FIG. 5, the default domain is the entire repository of the user's messaging data. Due to the large volume of data that will generally be searched when the domain is expanded to include the entire repository 520, preferred embodiments operate in conjunction with a data store that efficiently indexes all content of an email message, including binary attachments. The user can further restrict the search to a smaller domain if the user so chooses.

Figure 5B:
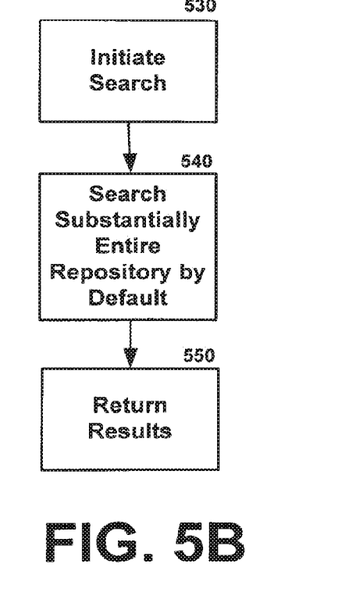
FIG. 5B provides a flowchart with exemplary steps for searching a substantially complete email repository by default.

FIG. 5B provides a simple flowchart displaying exemplary steps for searching a substantially complete email repository by default. Those steps are to initiate a search, either automatically or in response to some user action 530, then to search through a substantially entire email repository by default 540. Searching by default is searching without additional user action to specify the range, or scope, of the search. While typical email clients may provide the capability of searching an entire email repository, they do not do so by default and therefore require additional cogitation and/or action on the part of a user. This cogitation and action is inefficient, frustrating, and unhealthy, as discussed in the background section.

Figure 6A:
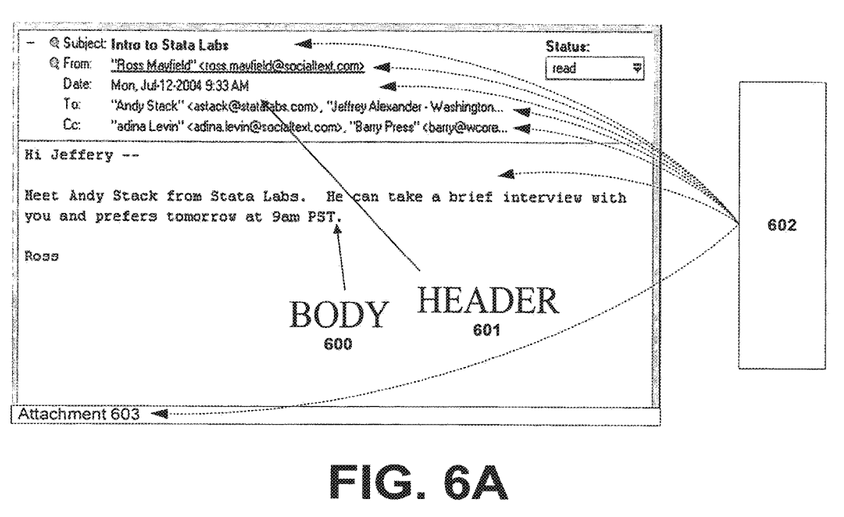
FIG. 6A illustrates an email client search process 602 that can search a message body 600 by default.

FIG. 6A illustrates an email client search process 602 that can search a message body 600 by default. Also illustrated are the various components of the message header 601 which may also be searched. In an email message, if there are characters that appear in the body 600 of a message, the message may be retrieved if the characters are searched for. In the example of FIG. 6, the exemplary message would be returned to search process 602 in a search result set that queried for the word "PST." Since PST appears in the body of the message, the message would be found. When a body search is conducted by default, no additional action is required by the user to have the system include text in the message body in the search domain.

Often, users will not remember the words in a subject line, or even from whom the message was sent. Email clients that perform default searching on subjects and senders/recipients without also searching the body therefore exclude a portion of emails that contains a wealth of potential search terms. As with default searching of an entire repository, as described above, searching email bodies by default can present a difficulty with the large volume of data that will generally be searched due to the expanded search range. Thus, preferred embodiments operate in conjunction with a data store that efficiently indexes the content of email messages. The user can further restrict the search to a smaller domain, e.g. by instructing the search process 602 not to search email bodies, if the user so chooses.

Figure 6B:
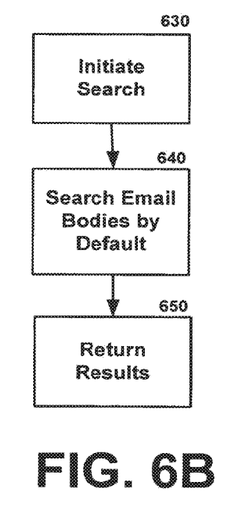
FIG. 6B illustrates a flowchart with exemplary steps for searching email bodies by default.

FIG. 6B provides a simple flowchart displaying exemplary steps for searching email bodies by default. Those steps are to initiate a search 630, either automatically or in response to some user action, then to search through emails within the search domain, e.g. a substantially entire repository as discussed above, by default 640. As mentioned above, searching by default is searching without additional user action to specify the range, or scope, of the search. In this case, no additional user action is required to demand a search of email bodies along with other email fields. While typical email clients may provide the capability of searching an email body, they do not do so by default and therefore require additional cogitation and/or action on the part of a user. This cogitation and action is inefficient, frustrating, and unhealthy, as discussed in the background section.

Figure 6C:
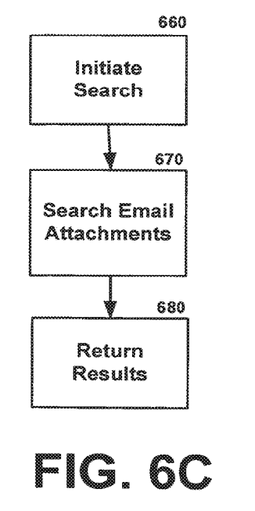
FIG. 6C illustrates a flowchart with exemplary steps for searching email attachments.

FIG. 6C provides a simple flowchart displaying exemplary steps for searching email attachments. The search through an email attachment is also introduced in FIG. 6B, which displays a search process 602 that searches the content of an attachment 603 in addition to any other fields that may be searched. Referring back to FIG. 6C, the exemplary steps are to initiate a search 660, either automatically or in response to some user action, then to search through email attachments 670 to those emails within the search domain, e.g. a substantially entire repository as discussed above, and finally to return results 680 comprising messages with attachments that contained the data that was searched for. An email attachment is a file that is associated with an email message, such as an image file, a text document file, a spreadsheet file, or the like. Typically, attachments are saved in some file format that an email client is not equipped to open and display. The attachment can be saved and opened with the application that was used to create the attachment.

Present email clients do not provide mechanisms for searching attachments. This is likely due to difficulty with the large volume of data that will generally be searched due to the expanded search category. Attachments often contain a much larger amount of data than an associated email. Thus, preferred embodiments operate in conjunction with a data store that efficiently indexes the content of email attachments. The use of a posting list for effecting such indexing is described in the Querying and Indexing section above.

Attachments may also be searched by default in various embodiments of the invention. Searching by default is searching without additional user action to specify the range, or scope, of the search. In this case, no additional user action is required to demand a search of attachments along with other searched email fields. An advantage of searching attachments by default is that complete searches of email content can be performed without any user cogitation or action to specifically identify the attributes of his search. This cogitation and action is inefficient, frustrating, and unhealthy, as discussed in the background section. When an embodiment of the invention conducts default searches of attachments, note that the user can always restrict the search to a smaller scope if desired, e.g. by instructing the search process 602 not to search email attachments, if the user so chooses.

Figure 7:
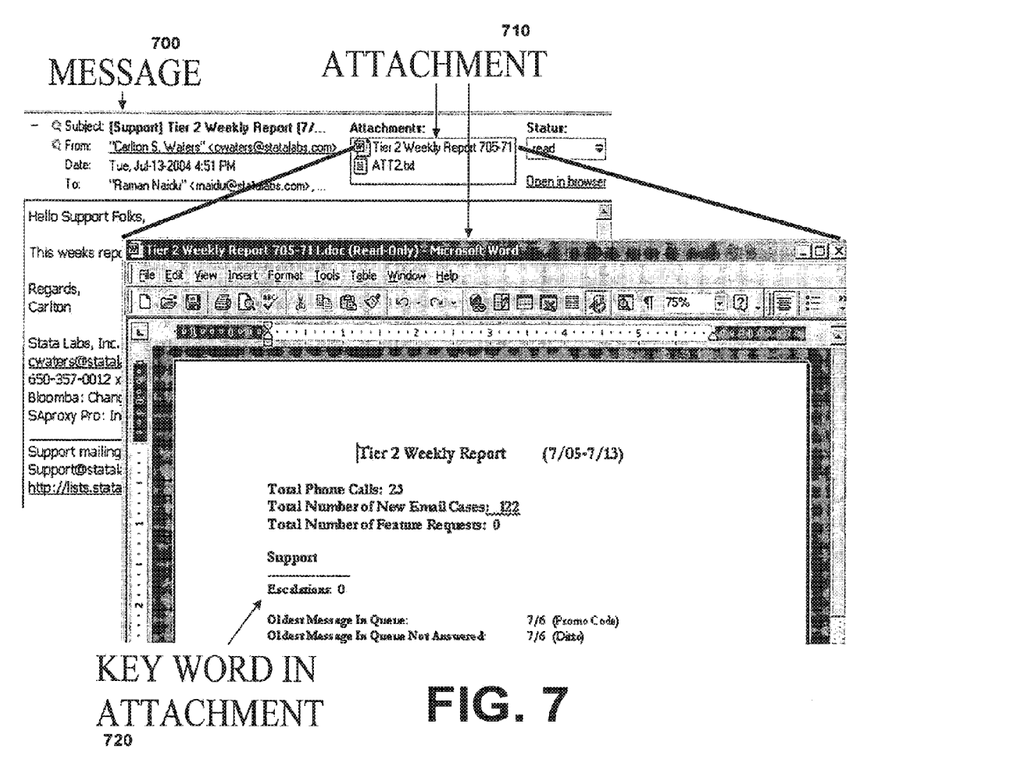
FIG. 7 illustrates an the email message 700 that would appear in a search result set for the key word "escalations" 720 since "escalations" 720 appears in an attachment 710 to the message 700.

In the example provided by FIG. 7, the email message 700 would be appear in a search result set for the key word "escalations" 720 since "escalations" 720 appears in the attachment 710 to the message 700. In embodiments that conduct attachment searches by default, no additional action is required by the user to have the system include text in the attachment body in the search domain.

In returning results to users, it is useful to display them in such a way that maximized the utility of the search results. An ordering of returned results that has proven useful is that of reverse-chronological order, with results that were generated most recently returned at the top of a result set and the older results returned below. Additionally, when the scope of search is expanded in the various ways described above, some filtering of the results may prove useful. To display the data in a meaningful result set, certain subsets may be excluded, such as unwanted messages that are either marked as deleted or spam.

Figure 8:
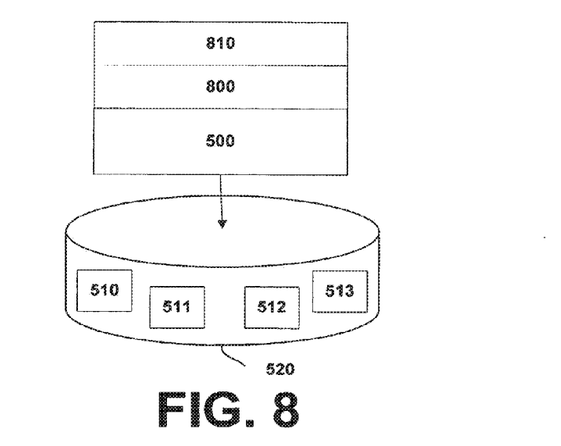
FIG. 8 provides an exemplary mechanism 800 to remove a group of unwanted messages from query results.

FIG. 8 provides an exemplary mechanism 800 to remove a group of unwanted messages from query results. Building on the components of FIG. 5A, described above, FIG. 8 illustrates a filter layer 800 that can remove unwanted results from a set of results that are returned by a query. The filter layer 800 may then pass the results to the UI layer 801 for display in the UI. If any ordering of the results is to be conducted, this may be carried out by the search layer itself 500, by the filter layer 800, the UI layer 801, or any other component with access to the result set or the UI that is ultimately presented to a user.

Various embodiments of the invention may be tightly-integrated with spam fighting software. These embodiments can perform an exhaustive series of heuristic tests on the header and body of an email to automatically identify and block spam, while ensuring the safe and timely delivery of legitimate messages. The invention may also offer users an added layer of protection using a new Bayesian filtering system that, through a form of manual training combined with advanced machine learning, can study past spam to more accurately identify and combat the tactics and tricks spammers use for new types of spam. A proven solution for blocking spam messages, the anti-spam technology can work directly with other aspects of the invention via menu buttons labeled, for example, "Delete as Spam" and "Not Spam," which allows the anti-spam technology of the invention to learn from what the user considers junk email. The invention may further include adjustable security settings that allow users to confidently preview a potential spam message without having to actually open the email, helping to avoid any viruses or embedded spyware that might alert spammers of a "live" email address. The invention can be configured to create spam report, which can provides details of each email marked as spam for a user's review, as well as the ability to filter multiple POP3 accounts on the user's desktop.

Figure 9:
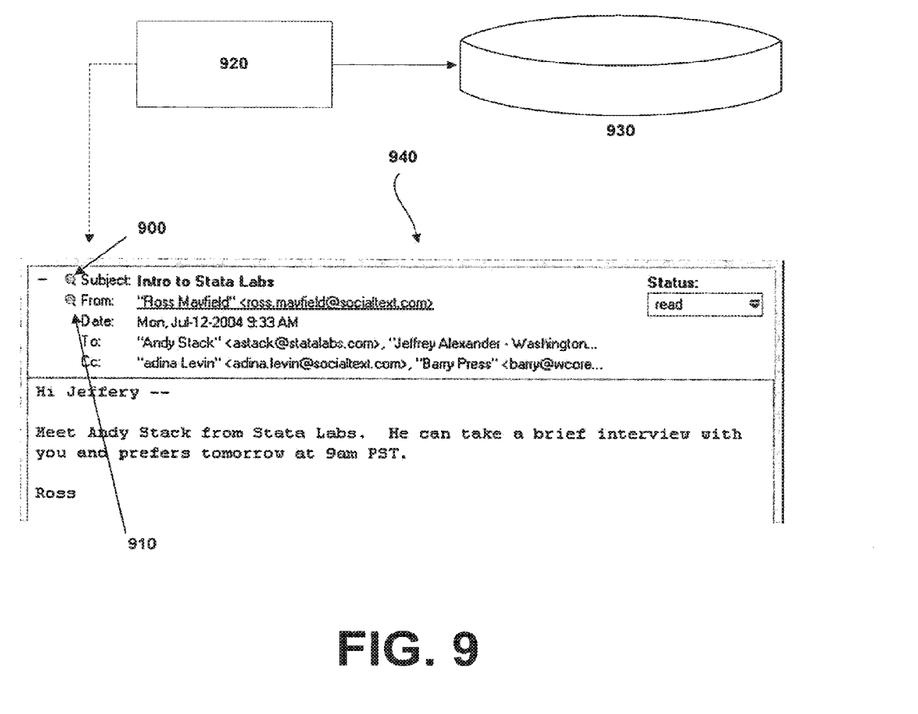
FIG. 9 illustrates a one-click search feature that may be implemented in various embodiments.

FIG. 9 illustrates a one-click search feature that may be implemented in various embodiments. A UI representation of an email 940, or email summary (not shown), may comprise search elements such as 900 and 910 which operate to initiate a search process 920 to search a repository 930 for a field associated with the selected search element 900, 910. The search elements 900, 910 may be associated with any field. In the exemplary embodiment of FIG. 9, two search elements 900, 910 are provided in the form of two magnifying glass icons that afford a user the ability to execute a related search to a given message with one mouse click. The user would click on the small magnifying glass icon 900 shown next to the subject field, for example, and a search process 920 would automatically execute a search of the repository 930 for other emails, or indeed any other personal data, or further any location on a network or internet, for the data of the subject line.

Upon clicking on the icon 900 next to the subject listing, a search may be performed to retrieve and display all messages that contain the same subject. Additional logic can be included in the search process 920 so that common modifications of the subject field, e.g. by adding, "Re:" and "Fw:" are ignored. In these embodiments, the messages that are stripped of such additional data may be treated as having the same subject as the original message.

Upon clicking on the exemplary icon 910 next to the sender listing, a search may be performed to retrieve and display all messages that contain the sender. The search process 920 may query sender fields, recipient fields, or any other fields in the repository 930 for the name of the sender or a portion thereof, either as the sender or the recipient.

Note that the one click search icons 900, 910 are one embodiment of many, other icons may be used, or the search element can be the subject line or name of the sender itself. Furthermore, the one click search aspect may be applied to any aspect of an email or other item of personal data. Thus, a search element may be associated with the date field to find all emails or other data associated with that date. A search element may be associated with strategic parts of an email body to provide searching on those properties. The wide range of potential variations to this aspect of the invention with be appreciated by those of skill in the art.

Figure 10:
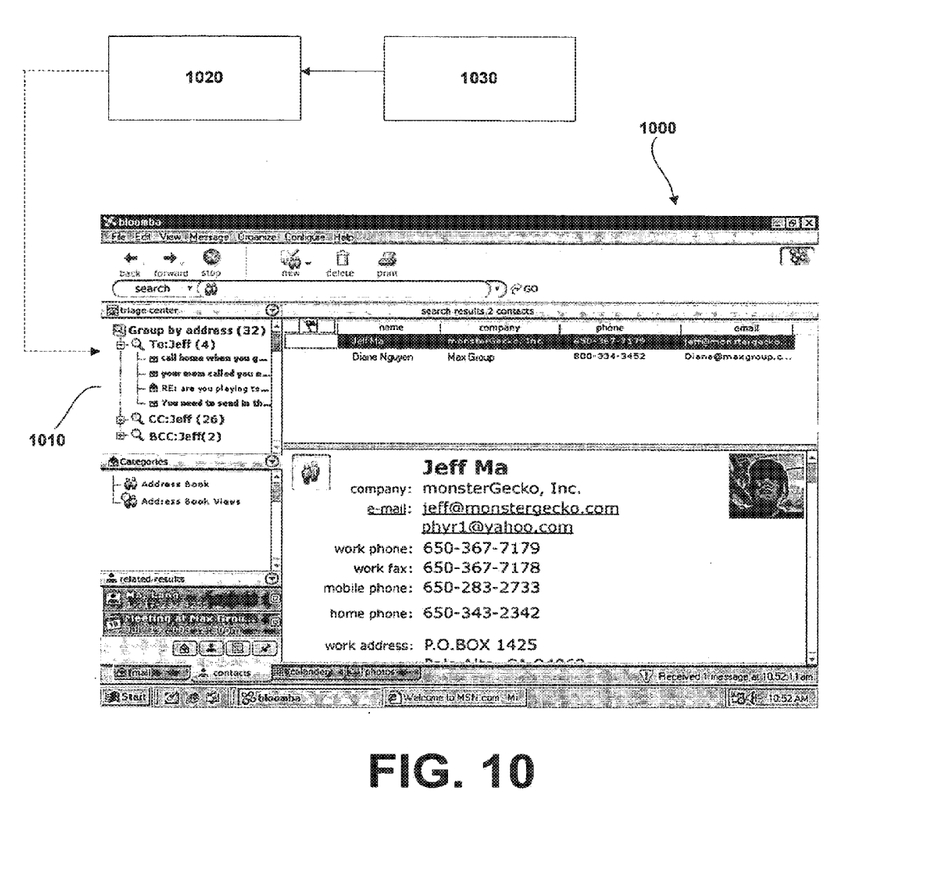
FIG. 10 provides an exemplary email client UI 1000 with a search aggregation pane 1010.

FIG. 10 provides an exemplary email client UI 1000 with a search aggregation pane 1010. In the exemplary embodiment of FIG. 10, the search aggregation pane 1010 is given a catchy name such as "triage center", and is positioned on the left side of the UI 1000. The search aggregation pane 1010 is a way to make the sophisticated search capabilities user friendly—it can aggregate "views" and shortcuts, and can be tailored for vertical markets (i.e., a real estate search aggregation pane). The search aggregation pane 1010 is different from the traditional folder hierarchy which the present email clients utilize in a left column. The search aggregation pane 1010 can be supported by an aggregation process 1020 in conjunction with a search process 1030.

What is claimed is:

1. A non-transitory computer-readable storage medium storing instructions which, when executed by one or more processors, cause said one or more processors to perform the steps of:
  in a user interface (UI) that is being displayed on a display of a computing device, displaying a particular email from a plurality of emails;
  wherein said particular email comprises a plurality of fields;
  while the particular email is being displayed in the UI, displaying, in the UI, a selectable element that is associated with a particular field of the plurality of fields;
  while displaying the particular email and the selectable element in the UI, receiving a user selection of said selectable element;
  in response to receiving said user selection of said selectable element, automatically and without further user interaction, performing the steps of:
    (a) extracting, from the particular email, a particular value that the particular email has for the particular field;
    (b) executing a search for emails, from said plurality of emails, that have the particular value in the particular field;
    (c) in response to executing the search, retrieving one or more emails, from the plurality of emails, that satisfy the search; and
    (d) displaying said one or more emails in the UI.

2. The non-transitory computer-readable storage medium of claim 1, wherein said plurality of fields comprises: a first field that displays a sender of said particular email, a second field that displays a recipient of said particular email, a third field that displays a subject of said particular email, and a fourth field that displays a date of said particular email.

3. The non-transitory computer-readable storage medium of claim 2, further comprising additional instructions which, when executed, cause said one or more processors to perform the steps of: in response to receiving said user selection of said selectable element, performing the steps of:
  i) determining whether said user selection pertains to the third field that displays the subject of said particular email; and
  ii) in response to determining that said user selection pertains to the third field, generating resulting content by removing one or more common modifiers from the content of the third field, and using the resulting content as the search string.

4. The non-transitory computer-readable storage medium of claim 2, wherein said particular email further comprises a fifth field that displays one or more copied-recipients of said particular email; wherein the instructions further comprise additional instructions which, when executed, cause said one or more processors to perform the steps of:
  displaying, in the UI, an additional selectable element that is associated with said fifth field;
  while displaying the particular email, receiving an additional selection of said additional selectable element; and
  in response to receiving said additional selection of said additional selectable element, performing the steps of:
    i) executing an additional search for emails, from said plurality of emails, using each of the one or more copied-recipients displayed in said fifth field as search strings;
    ii) in response to executing the additional search, retrieving one or more additional emails, from the plurality of emails, that satisfy the search; and
    iii) displaying said one or more additional emails in the UI.

5. The non-transitory computer-readable storage medium of claim 2, further comprising additional instructions which, when executed, cause said one or more processors to perform the steps of: in response to receiving said user selection of said selectable element, performing the steps of:
  i) executing an additional search for data, located on a network or the Internet, using the content of the particular field as the search string;
  ii) in response to executing the additional search, retrieving one or more files, from the network or the Internet, that satisfy the search; and
  iii) displaying said one or more files in the UI.

6. The non-transitory computer-readable storage medium of claim 2, further comprising additional instructions which, when executed, cause said one or more processors to perform the steps of: displaying, in the UI, an additional selectable element associated with any of the first, second, third and fourth fields not associated with the selectable element;
  while displaying the particular email, receiving an additional selection of said additional selectable element; and
  in response to receiving the additional selection, performing an additional search of emails from said plurality of emails.

7. The non-transitory computer-readable storage medium of claim 2, wherein the selectable element is displayed in the UI at a location close to the particular field; and wherein the selectable element is displayed as an icon depicting a magnifying glass.

8. The non-transitory computer-readable storage medium of claim 2, wherein the particular email is displayed in a form of an email summary comprising said first, second, third and fourth fields.

9. The non-transitory computer-readable storage medium of claim 2, wherein said instructions for executing the search further comprise additional instructions which, when executed, cause said one or more processors to perform: searching, using the content of the particular field as the search string, for data in any one of: a calendar item, a task item, a contact, a file, the Internet, and an intranet.

10. The non-transitory computer-readable storage medium of claim 3, wherein said one or more common modifiers comprise any one of: Re:, re:, RE:, Fw:, fw:, and FW:.

11. A method comprising:
  in a user interface (UI) that is being displayed on a display of a computing device, displaying a particular email from a plurality of emails;

wherein said particular email comprises a plurality of fields;

while the particular email is being displayed in the UI, displaying, in the UI, a selectable element that is associated with a particular field of the plurality of fields;

while displaying the particular email and the selectable element in the UI, receiving a user selection of said selectable element;

in response to receiving said user selection of said selectable element, automatically and without further user interaction, performing the steps of:

(a) extracting, from the particular email, a particular value that the particular email has for the particular field;

(b) executing a search for emails, from said plurality of emails, that have the particular value in the particular field;

(c) in response to executing the search, retrieving one or more emails, from the plurality of emails, that satisfy the search; and (d) displaying said one or more emails in the UI.

12. The method of claim 11, wherein said plurality of fields comprises: a first field that displays a sender of said particular email, a second field that displays a recipient of said particular email, a third field that displays a subject of said particular email, and a fourth field that displays a date of said particular email.

13. The method of claim 12, further comprising:
in response to receiving said user selection of said selectable element, performing the steps of:
  i) determining whether said user selection pertains to the third field that displays the subject of said particular email; and
  ii) in response to determining that said user selection pertains to the third field, generating resulting content by removing one or more common modifiers from the content of the third field, and using the resulting content as the search string.

14. The method of claim 12, wherein said particular email further comprises a fifth field that displays one or more copied-recipients of said particular email; wherein the method further comprises:
displaying, in the UI, an additional selectable element that is associated with said fifth field;
while displaying the particular email, receiving an additional selection of said additional selectable element; and
in response to receiving said additional selection of said additional selectable element, performing the steps of:
  i) executing an additional search for emails, from said plurality of emails, using each of the one or more copied-recipients displayed in said fifth field as search strings;
  ii) in response to executing the additional search, retrieving one or more additional emails, from the plurality of emails, that satisfy the search; and
  iii) displaying said one or more additional emails in the UI.

15. The method of claim 12, further comprising:
in response to receiving said user selection of said selectable element, performing the steps of:
  i) executing an additional search for data, located on a network or the Internet, using the content of the particular field as the search string;
  ii) in response to executing the additional search, retrieving one or more files, from the network or the Internet, that satisfy the search; and
  iii) displaying said one or more files in the UI.

16. The method of claim 12, further comprising:
displaying, in the UI, an additional selectable element associated with any of the first, second, third and fourth fields not associated with the selectable element;
while displaying the particular email, receiving an additional selection of said additional selectable element; and
in response to receiving the additional selection, performing an additional search of emails from said plurality of emails.

17. The method of claim 12, wherein the selectable element is displayed in the UI at a location close to the particular field; and wherein the selectable element is displayed as an icon depicting a magnifying glass.

18. The method of claim 12, wherein the particular email is displayed in a form of an email summary comprising said first, second, third and fourth fields.

19. The method of claim 12, executing the search comprises: searching, using the content of the particular field as the search string, for data in any one of: a calendar item, a task item, a contact, a file, the Internet, and an intranet.

20. The method of claim 13, wherein said one or more common modifiers comprise any one of: Re:, re:, RE:, Fw:, fw:, and FW:.

* * * * *